United States Patent
Hu et al.

(10) Patent No.: US 12,221,955 B2
(45) Date of Patent: Feb. 11, 2025

(54) CONNECTING STRUCTURE, EXHAUST SILENCER, SILENCER, AND COMPRESSOR

(71) Applicant: ANHUI MEIZHI COMPRESSOR CO., LTD., Anhui (CN)

(72) Inventors: Binbin Hu, Anhui (CN); Dongdong Song, Anhui (CN); Gang Huang, Anhui (CN); Zhiqi Yan, Anhui (CN)

(73) Assignee: ANHUI MEIZHI COMPRESSOR CO., LTD., Anhui (CN)

( * ) Notice: Subject to any disclaimer, the term of this patent is extended or adjusted under 35 U.S.C. 154(b) by 271 days.

(21) Appl. No.: 17/722,728

(22) Filed: Apr. 18, 2022

(65) Prior Publication Data

US 2022/0243712 A1 Aug. 4, 2022

Related U.S. Application Data

(63) Continuation of application No. PCT/CN2020/072065, filed on Jan. 14, 2020.

(30) Foreign Application Priority Data

Oct. 21, 2019 (CN) .......................... 201911000165.8

(51) Int. Cl.
*F04B 39/00* (2006.01)
*F01N 1/08* (2006.01)
(Continued)

(52) U.S. Cl.
CPC .......... *F04B 39/0061* (2013.01); *F01N 1/082* (2013.01); *F01N 13/08* (2013.01);
(Continued)

(58) Field of Classification Search
CPC F04B 39/123; F04B 39/0061; F04B 39/0055; F04B 39/0072; F04B 39/0027;
(Continued)

(56) References Cited

U.S. PATENT DOCUMENTS

| | | | |
|---|---|---|---|
| 3,181,899 A | * | 5/1965 | McKight, Jr. ........... F16L 41/14 285/139.2 |
| 6,769,880 B1 | | 8/2004 | Hogan et al. |

(Continued)

FOREIGN PATENT DOCUMENTS

| | | |
|---|---|---|
| CN | 101545474 A | 9/2009 |
| CN | 204140416 U | 2/2015 |

(Continued)

OTHER PUBLICATIONS

Notice of Reasons for Refusal dated Jul. 18, 2023 received in Japanese Patent Application No. JP 2022-519412.
(Continued)

*Primary Examiner* — Peter J Bertheaud
(74) *Attorney, Agent, or Firm* — Scully, Scott, Murphy & Presser, P.C.

(57) ABSTRACT

A connecting structure, an exhaust silencer, a silencer and a compressor are provided. The connecting structure has a connecting housing and an exhaust pipe assembly. The connecting housing has a silencing chamber and a sealing portion. One end of the exhaust pipe assembly passes through the sealing portion and extends into the silencing chamber. Another end of the exhaust pipe assembly is arranged outside the connecting housing. Thus, the silencing chamber is in communication with an outside space of the connecting housing through the exhaust pipe assembly.

20 Claims, 2 Drawing Sheets

(51) Int. Cl.
  *F01N 13/08* (2010.01)
  *F04B 39/12* (2006.01)
  *F04B 39/14* (2006.01)
  *F04C 23/00* (2006.01)

(52) U.S. Cl.
  CPC ...... *F04B 39/0027* (2013.01); *F04B 39/0055* (2013.01); *F04B 39/0072* (2013.01); *F04B 39/0083* (2013.01); *F04B 39/121* (2013.01); *F04B 39/123* (2013.01); *F04B 39/125* (2013.01); *F04B 39/14* (2013.01); *F04C 23/008* (2013.01); *Y10S 181/403* (2013.01); *Y10S 417/902* (2013.01)

(58) Field of Classification Search
  CPC .. F04B 39/121; F04B 39/0083; F04B 39/125; F04B 39/14; Y10S 417/902; Y10S 181/403; F04C 23/008; F01N 1/082; F01N 13/08
  See application file for complete search history.

(56) References Cited

U.S. PATENT DOCUMENTS

| | | | |
|---|---|---|---|
| 2005/0135941 A1* | 6/2005 | Seo | F04B 39/0061 417/572 |
| 2014/0322040 A1 | 10/2014 | Cho | |
| 2018/0355773 A1 | 12/2018 | Nakayama et al. | |

FOREIGN PATENT DOCUMENTS

| | | |
|---|---|---|
| CN | 205533234 U | 8/2016 |
| CN | 206708018 U | 12/2017 |
| CN | 107989774 A | 5/2018 |
| CN | 107989775 A | 5/2018 |
| CN | 110318985 A | 10/2019 |
| JP | H09303557 A | 11/1997 |
| JP | H11303998 A | 11/1999 |
| JP | 2005220793 A | 8/2005 |
| JP | 2010174851 A | 8/2010 |
| WO | 2015138182 A1 | 9/2015 |

OTHER PUBLICATIONS

Notice of Reasons for Refusal dated May 9, 2023 received in Japanese Patent Application No. JP 2022-519412.
Notice of Decision of Granting Patent Right for Invention dated Jun. 9, 2023 received in Chinese Patent Application No. 201911000165.8.
Second Office Action dated May 13, 2023 received in Chinese Patent Application No. 201911000165.8.
First Office Action dated Feb. 15, 2023 received in Chinese Patent Application No. 201911000165.8.
International Search Report dated Jul. 21, 2020 received in International Application No. PCT/CN2020/072065 together with an English language translation.

* cited by examiner

CONNECTING STRUCTURE, EXHAUST SILENCER, SILENCER, AND COMPRESSOR

The present application is a continuation application of PCT International Application No. PCT/CN2020/072065, which claims priority to and benefits of Chinese Patent Application No. 201911000165.8, entitled "CONNECTING STRUCTURE, EXHAUST SILENCER, SILENCER, AND COMPRESSOR", filed with China National Intellectual Property Administration on Oct. 21, 2019, the entire contents of which are incorporated herein by reference for all purposes. No new matter has been introduced.

FIELD

The present disclosure relates to the field of compressor technologies, and more particularly, to a connecting structure, an exhaust silencer, a silencer, and a compressor.

BACKGROUND

With the improvement of quality of life, people raise increasingly higher requirements on the noise of compressors at work. To reduce noises, a silencer is often use in a compressor. In the related art, one-piece silencers, due to the smaller number of parts, are convenient for manufacturing and mounting. However, a silencer housing and an exhaust pipe cannot be made of different non-metallic materials as they shall be welded together, which results in higher material costs.

SUMMARY

The present disclosure aims to solve at least one of the technical problems existing in the prior art or the related art.

In this regard, an object of the present disclosure is to provide a connecting structure.

Another object of the present disclosure is to provide an exhaust silencer.

Yet another object of the present disclosure is to provide a silencer.

Still yet another object of the present disclosure is to provide a compressor.

In order to achieve the above objects, the first aspect of the present disclosure provides a connecting structure. The connecting structure includes a connecting housing having a silencing chamber defined therein. A sealing portion is provided in the silencing chamber. An exhaust pipe assembly is detachably connected to the sealing portion. The exhaust pipe assembly has one end passing through the sealing portion and extending into the silencing chamber, and another end arranged outside the connecting housing, to enable the silencing chamber and an outside space of the connecting housing to be in communication with each other through the exhaust pipe assembly.

According to the connecting structure provided by the present disclosure, by defining the silencing chamber in the connecting housing, the noise of the compressor at work can be reduced by utilizing the silencing chamber. In addition, since one end of the exhaust pipe assembly passes through the sealing portion and extends into the silencing chamber and the other end of the exhaust pipe assembly is arranged outside the connecting housing, the exhaust pipe assembly enables the silencing chamber to be in communication with the outside space of the connecting housing. Thus, after the refrigerant flows into the silencing chamber for implementing sound reduction, the refrigerant can flow out of the silencing chamber through the exhaust pipe assembly. It should be noted that, since the exhaust pipe assembly is detachably connected to the sealing portion, the exhaust pipe assembly and the connecting housing can be made of different non-metallic materials, thereby saving the material costs. Further, in order to reduce the material costs, the connecting housing can be made of polybutylene terephthalate (PBT) material, and the exhaust pipe can be made of polyhexamethylene adipamide (PA66) material, in order to meet operation requirements of high temperature resistance and high-pressure resistance of the exhaust pipe. It can be understood that, through the detachable connection between the exhaust pipe assembly and the sealing portion, the material costs of the silencer can be reduced by using different non-metallic materials, under the premise of satisfying the operation requirements of the connecting housing and the exhaust pipe.

In the above technical solution, the exhaust pipe assembly can include an exhaust pipe, and a connecting member arranged on the exhaust pipe; the exhaust pipe includes a pipe body, and a connecting portion connected to the pipe body and arranged on an end of the pipe body close to the silencing chamber; an end of the connecting portion facing away from the pipe body is connected to the sealing portion to restrict movements of the exhaust pipe towards an outside of the connecting housing.

In this technical solution, the exhaust pipe assembly includes the exhaust pipe and the connecting member; the exhaust pipe can include the connecting portion and the pipe body that are connected to each other. By disposing the connecting portion on the end of the pipe body close to the silencing chamber, the connecting portion can be connected to the sealing portion in the silencing chamber. In addition, the pipe body is arranged outside the silencing chamber. Further, the end of the connecting portion facing away from the pipe body is connected to the sealing portion to restrict the movements of the exhaust pipe towards the outside of the connecting housing. Here, one end of the connecting portion facing away from the pipe body passes through the sealing portion and is arranged in the silencing chamber, and the other end of the connecting portion close to the pipe body is arranged outside the connecting housing. In this way, the silencing chamber and the outside space of the connecting housing can be in communication with each other through the connecting portion.

It should be noted that the connecting portion and the pipe body are formed as one piece. Thus, the exhaust pipe can have a simplified structure, which facilitates assembly and is beneficial to improving the air tightness of the exhaust pipe.

Here, the end of the connecting portion facing away from the pipe body can be engaged with the sealing portion. In this way, on the one hand, the movements of the exhaust pipe towards the outside of the connecting housing can be restricted, and on the other hand, mounting positions of the connecting portion and the sealing portion can be promptly aligned for quick assembly of the connecting portion and the sealing portion. The end of the connecting portion facing away from the pipe body may abut against the sealing portion to only restrict the movements of the exhaust pipe relative to the connecting housing towards the outside of the connecting housing. The exhaust pipe can move, relative to the connecting housing, towards the inside of the connecting housing, and thus the exhaust pipe can move along the inside of the connecting housing and can be extracted from the assembly position, thereby detaching the exhaust pipe from the connecting housing.

In the above technical solution, the connecting member is detachably connected to the connecting portion and abuts against an outer wall of the connecting housing to restrict movements of the exhaust pipe towards an inside of the connecting housing.

In this technical solution, since the connecting member is detachably connected to the connecting portion and abuts against the outer wall of the connecting housing, the connecting member can restrict the movements of the exhaust pipe towards the inside of the connecting housing. Here, since an end of the connecting portion facing away from the pipe body abuts against the sealing portion, the movements of the exhaust pipe towards the outside of the connecting housing are restricted, thereby fixing the exhaust pipe on the connecting housing. It should be noted that the connecting member and the connecting portion are detachably connected to each other. When the connecting member is being detached, the exhaust pipe can be pulled out along a direction of the inside of the connecting housing to detach the exhaust pipe assembly from the connecting housing; and the exhaust pipe can also be inserted along a direction of the outside of the connecting portion, and the connecting member can be subsequently connected to the connecting portion, thereby fixing and mounting the exhaust pipe assembly and the connecting housing.

In the above technical solution, the connecting structure further includes threads provided on an outer wall of an end of the connecting portion close to the pipe body. The connecting member is a nut arranged on the connecting portion and corresponding to the threads, and the exhaust pipe assembly and the sealing portion are detachably connected to each other through fitting between the nut and the threads.

In this technical solution, the threads are provided on the outer wall of the end of the connecting portion close to the pipe body, the connecting member is the nut fitting the threads, and the exhaust pipe can be strained and fixed to a side close to the pipe body through the fitting between the nut and the threads. It should be noted that the fitting between the nut and the threads facilitates the disassembly and assembly of the exhaust pipe assembly, and the nut can also provide a pretension force for the connection between the connecting portion and the connecting housing to improve the stability of the assembly.

Here, one or two nuts may be provided. When two nuts are provided, the voluntary loosening of the nuts can be prevented.

In the above technical solution, the connecting structure further includes a slot arranged on an outer wall of an end of the connecting portion close to the pipe body, the connecting member is a snap ring arranged in the slot, and the exhaust pipe assembly and the sealing portion are detachably connected to each other through fitting between the snap ring and the slot.

In this technical solution, the slot is arranged at the end of the connecting portion close to the pipe body, and the connecting member is the snap ring arranged in the slot, such that a detachable connection between the exhaust pipe assembly and the sealing portion can be realized to facilitate quick assembly of and disassembly between the exhaust pipe and the connecting housing.

In the above technical solution, the connecting structure further includes a sealing member in a shape of a ring sleeved on the connecting portion; one side of the sealing member is connected to an outer wall of the connecting portion, and the other side of the sealing member is connected to an inner wall of the sealing portion, to implement a sealing connection between the exhaust pipe and the sealing portion through the sealing member.

In this technical solution, the sealing member in a shape of a ring is arranged on the connecting portion, one side of the sealing member is connected to the outer wall of the connecting portion, and the other side of the sealing member is connected to the inner wall of the sealing portion, to seal the gap between the outer wall of the connecting portion and the inner wall of the sealing portion. In this way, the sealing connection between the exhaust pipe and the sealing portion can be formed to prevent the high-pressure refrigerant from leaking through the gap between the connecting portion of the exhaust pipe and the sealing portion.

In the above technical solution, along a radial direction of the sealing portion, a first limiting portion is formed by the inner wall of the sealing portion protruding inwards, and a second limiting portion is formed by the outer wall of the connecting portion protruding outwards. The movements of the exhaust pipe towards the outside of the connecting housing are restricted through cooperation between the first limiting portion and the second limiting portion.

In this technical solution, along the radial direction of the sealing portion, the first limiting portion is formed by the inner wall of the sealing portion protruding inwards; and along the radial direction of the sealing portion, the second limiting portion is formed by the outer wall of the connecting portion protruding outwards. Here, the second limiting portion is arranged in the sealing portion, and along an axial direction of the connecting portion, a side of the second limiting portion close to the pipe body abuts against a side of the first limiting portion facing away from the pipe body, thereby restricting the movements of the exhaust pipe towards the outside of the connecting housing.

In the above technical solution, along the radial direction of the sealing portion, a first accommodating space is defined between an outer wall of the second limiting portion and the inner wall of the sealing portion, and the sealing member is arranged in the first accommodating space. Alternatively or additionally, along an axial direction of the sealing portion, a second accommodating space is defined between the first limiting portion and the second limiting portion, and the sealing member is arranged in the second accommodating space.

In this technical solution, along the radial direction of the sealing portion, the first accommodating space is defined between the outer wall of the second limiting portion and the inner wall of the sealing portion, and the sealing member is arranged in the first accommodating space. In this case, one the one hand, the outer wall of the sealing member is connected to the inner wall of the sealing portion, and the inner wall of the sealing member is connected to the second limiting portion, to implement the sealing connection between the exhaust pipe and the sealing portion; and on the other hand, the sealing member is arranged in the first accommodating space to restrict the movements of the sealing member relative to the connecting portion along the axial direction of the connecting portion, thereby preventing the sealing member from sliding out of the second limiting portion during mounting of the exhaust pipe assembly. Alternatively, along the axial direction of the sealing portion, the second accommodating space is defined between the first limiting portion and the second limiting portion. The sealing member disposed in the second accommodating space can seal the exhaust pipe and the sealing portion along the axial direction of the sealing portion. When the connecting member provides the connecting portion with a pretension force towards a side of the pipe body, the sealing member disposed in the second accommodating space can buffer the pressure exerted on the sealing member by the second limiting portion. In this way, it is avoided that the sealing performance of the sealing member deteriorates when the sealing member is damaged under an excessive pressure. It can be understood that both the first accommodating space and the second accommodating space are provided and are each provided with the sealing member, and the gaps between the connecting portion and the sealing portion are sealed along the axial direction and the radial direction of the sealing portion, thereby further improving the sealing effect.

In the above technical solution, the connecting structure further includes a sealing groove defined in the outer wall of the second limiting portion; the first accommodating space is defined by the sealing groove and the inner wall of the sealing portion; the sealing member includes a first sealing member sleeved in the sealing groove; and along a radial direction of the first sealing member, an outer wall of the first sealing member is connected to the inner wall of the sealing portion, and an inner wall of the first sealing member is connected to a bottom of the sealing groove, to implement the sealing connection between the exhaust pipe and the sealing portion.

In this technical solution, the sealing groove is defined in the outer wall of the second limiting portion and located in the sealing portion, the first accommodating space is defined by the sealing groove and the inner wall of the sealing portion, the sealing member can include the first sealing member arranged in the sealing groove, and along the radial direction of the first sealing member, the outer wall of the first sealing member is connected to the inner wall of the sealing portion, and the inner wall of the first sealing member is connected to the bottom of the sealing groove, thereby sealing the gap between the connecting portion and the sealing portion along the radial direction of the sealing portion, and implementing the sealing connection between the exhaust pipe and the sealing portion.

In the above technical solution, the first limiting portion is of a stepped structure and includes a first step arranged on one side of the first limiting portion facing away from the pipe body and a second step arranged on the other side of the first limiting portion close to the pipe body. The sealing member includes a second sealing member arranged in the second accommodating space, the second accommodating space is defined between the second limiting portion and the second step, and along an axial direction of the second sealing member, two ends of the second sealing member are connected to the second limiting portion and the second step, respectively, to implement the sealing connection between the exhaust pipe and the sealing portion.

In this technical solution, the first limiting portion is of the stepped structure, and includes the first step arranged on one side of the first limiting portion facing away from the pipe body and the second step arranged on the other side of the first limiting portion close to the pipe body. In this way, along the axial direction of the connecting portion, the side of the second limiting portion close to the pipe body abuts against the first step to define the second accommodating space between the second limiting portion and the second step. The sealing member can include the second sealing member arranged in the second accommodating space, and along the axial direction of the second sealing member, two ends of the second sealing member are connected to the second limiting portion and the second step, respectively, to seal the gap between the connecting portion and the sealing portion along the axial direction of the sealing portion, thereby implementing the sealing connection between the exhaust pipe and the sealing portion.

A second aspect of the present disclosure provides an exhaust silencer. The exhaust silencer includes a casing, the connecting structure as described in any one of technical solutions in the first aspect, in which the connecting housing of the connecting structure is connected to the casing, and an exhaust silencing chamber arranged in the casing and in communication with the silencing chamber of the connecting structure.

The exhaust silencer according to the present disclosure includes the connecting structure as described in any one of the technical solutions in the first aspect, the connecting housing of the connecting structure is connected to the casing of the exhaust silencer, and the exhaust silencing chamber is in communication with the silencing chamber. Therefore, the exhaust silencer has the technical effects of any technical solution in the first aspect, and the detailed description thereof will be omitted herein.

A third aspect of the present disclosure provides a silencer. The silencer includes a suction silencer having a suction silencing chamber defined therein, and the exhaust silencer as described in the technical solutions in the second aspect. The exhaust silencer is connected to the suction silencer, and the exhaust silencing chamber is in communication with the suction silencing chamber.

The silencer provided based on the present disclosure includes the suction silencer having the suction silencing chamber defined therein to reduce the noise of the compressor at work, and the exhaust silencer as described in the technical solutions in the second aspect. The exhaust silencer is connected to the suction silencer, and the exhaust silencing chamber is in communication with the suction silencing chamber. Therefore, the silencer has the technical effects of the technical solutions in the second aspect, and the detailed description thereof will be omitted herein.

A fourth aspect of the present disclosure provides a compressor. The compressor includes a compressor housing, and the silencer as described in the technical solutions in the third aspect arranged in the compressor housing. Therefore, the compressor has the technical effects of the technical solutions in the third aspect, and the detailed description thereof will be omitted herein.

Additional aspects and advantages of the present disclosure will become apparent in the following description, or can be learned from practicing of the present disclosure.

Figure 1:
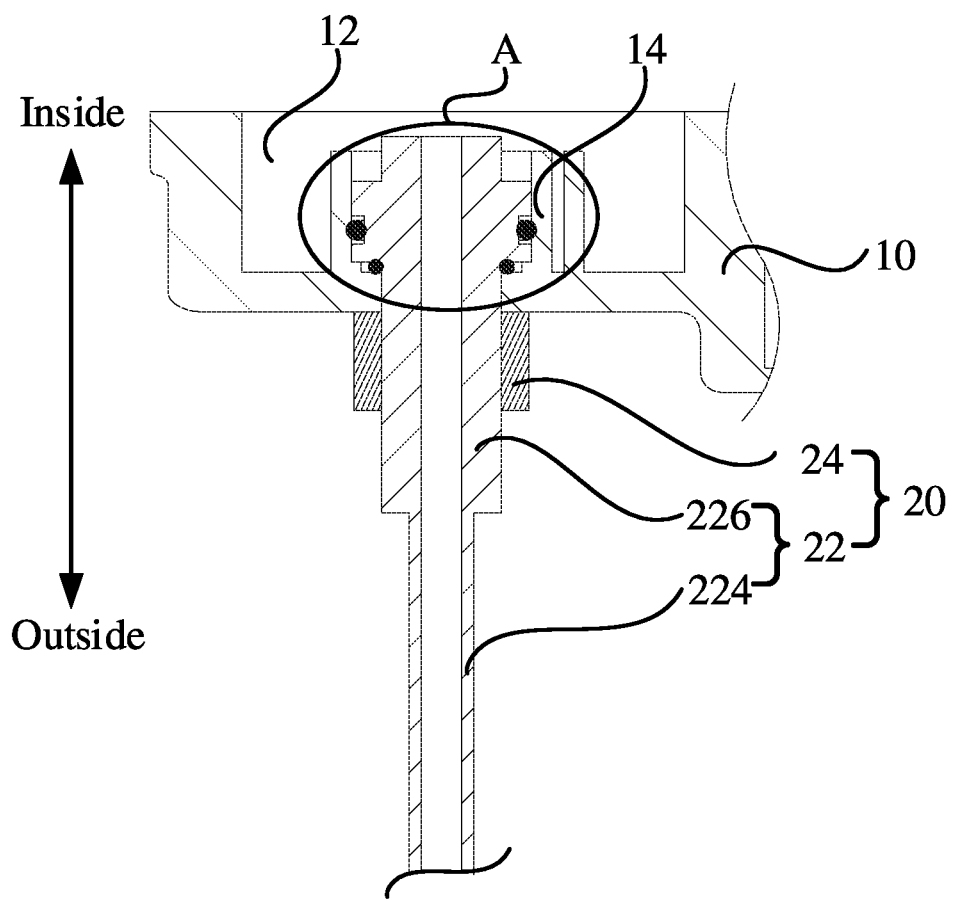
FIG. 1 is a structural schematic diagram of a connecting structure according to an embodiment of the present disclosure.

Correspondences between the reference numerals in FIG. 1 to FIG. 3 and components are given as below:

10 connecting housing; 12 silencing chamber; 14 sealing portion; 20 exhaust pipe assembly; 22 exhaust pipe; 24 connecting member; 224 pipe body; 226 connecting portion; 30 sealing member; 32 first sealing member; 34 second sealing member; 142 first limiting portion; 1422 first step; 1424 second step; 2262 second limiting portion; 2264 first accommodating space; 2266 sealing groove; 1426 second accommodating space.

DESCRIPTION OF EMBODIMENTS

In order to unambiguously explain the above objects, features, and advantages of the present disclosure, the present disclosure will be described in detail below with reference to the accompanying drawings and specific embodiments. It should be noted that the embodiments of the present disclosure and features in the embodiments may be combined with each other without any conflict.

Specific details are set forth in the following description to facilitate a full understanding of the present disclosure. However, the present disclosure can also be implemented in ways different from those described herein. Therefore, the protection scope of the present disclosure is not limited by specific embodiments disclosed below.

Some embodiments of the present disclosure will be described below with reference to FIG. 1 to FIG. 3.

As illustrated in FIG. 1, an embodiment of the present disclosure provides a connecting structure. The connecting structure includes a connecting housing 10 and an exhaust pipe assembly 20. The connecting housing 10 has a silencing chamber 12 defined therein to reduce the noise of the compressor at work. The exhaust pipe assembly 20 has one end passing through a sealing portion 14 and extending into the silencing chamber 12, and another end arranged outside the connecting housing 10. Thus, the exhaust pipe assembly 20 enables the silencing chamber 12 and an outside space of the connecting housing 10 to be in communication with each other, such that a refrigerant, after flowing into the silencing chamber 12 for sound reduction, can flow out of the silencing chamber 12 through the exhaust pipe assembly 20.

Further, the exhaust pipe assembly 20 is detachably connected to the sealing portion 14, and thus the exhaust pipe assembly 20 and the connecting housing 10 can be made of different materials, thereby saving material costs.

Further, the connecting housing 10 can be made of PBT material to lower the material costs, and an exhaust pipe 22 can be made of PA66 material to meet operation requirements of high temperature resistance and high-pressure resistance of the exhaust pipe 22.

As illustrated in FIG. 1, according to an alternative embodiment, the exhaust pipe assembly 20 includes the exhaust pipe 22, and a connecting member 24 arranged on the exhaust pipe 22. Thus, the connecting member 24 can connect the exhaust pipe 22 to the connecting housing 10. The exhaust pipe 22 includes a pipe body 224 and a connecting portion 226. The pipe body 224 is connected to the connecting portion 226, and the connecting portion 226 is disposed at an end of the pipe body 224 close to the silencing chamber 12. In this embodiment, an end of the connecting portion 226 facing away from the pipe body 224 passes through the sealing portion 14 and extends into the silencing chamber 12, and a part of the connecting portion 226 extending into the sealing portion 14 is connected to the sealing portion 14 to restrict movements of the exhaust pipe 22 towards an outside of the connecting housing 10. In this embodiment, an end of the connecting portion 226 close to the pipe body 224 is arranged outside the connecting housing 10 to enable the silencing chamber 12 to be in communication with the outside space of the connecting housing 10 through the connecting portion 226.

Further, the connecting portion 226 and the pipe body 224 are formed as one piece, and accordingly, the exhaust pipe 22 can have a simple and compact structure and have satisfactory air tightness and high-pressure resistance.

Further, the end of the connecting portion 226 facing away from the pipe body 224 is engaged with the sealing portion 14 to restrict the movements of the exhaust pipe 22 towards the outside of the connecting housing 10.

Further, the end of the connecting portion 226 facing away from the pipe body 224 abuts against the sealing portion 14. In this way, on the one hand, the movements of the exhaust pipe 22 towards the outside of the connecting housing 10 can be restricted; and on the other hand, the exhaust pipe 22 can be pulled out from its assembly position along the inside of the connecting housing 10, so as to detach the exhaust pipe 22 from the connecting housing 10.

As illustrated in FIG. 1, according to an alternative embodiment, the connecting member 24 is detachably connected to the connecting portion 226 and abuts against the outer wall of the connecting housing 10. Thus, the connecting member 24 can restrict the movements of the exhaust pipe 22 towards the inside of the connecting housing 10, thereby fixing the exhaust pipe 22 to the connecting housing 10. Further, when the connecting member 24 is detached, the exhaust pipe 22 can be pulled out from a side of the sealing portion 14 facing away from the pipe body 224 to detach the exhaust pipe assembly 20 from the connecting housing 10. In addition, the exhaust pipe 22 can be inserted from the side of the sealing portion 14 facing away from the pipe body 224, and the connecting member 24 can be connected to the connecting portion 226, thereby fixing and mounting the exhaust pipe assembly 20 with the connecting housing 10.

As illustrated in FIG. 1, according to an alternative embodiment, the connecting member 24 is a nut, the connecting portion 226 have threads arranged on an outer wall at the end thereof close to the pipe body 224 and fitting the nut, and the exhaust pipe 22 is strained and fixed towards a side close to the pipe body 224 through fitting between the nut and the threads. Further, the fitting between the nut and the threads facilitates the disassembly and assembly of the exhaust pipe assembly 20, and the nut can also provide a pretension force for a connection between the connecting portion 226 and the connecting housing 10, thereby improving the stability of the assembly.

Further, one nut is provided. The connecting portion 226 can be locked and fixed to the connecting housing 10 by means of the one nut.

Further, two nuts are provided to prevent the nuts from voluntary loosening.

In addition to the features provided in any of the above embodiments, according to an alternative embodiment, the connecting member 24 is a snap ring, the connecting portion 226 has a slot provided on the outer wall at the end thereof close to the pipe body 224, and the snap ring is arranged in the slot, forming a detachable connection between the exhaust pipe assembly 20 and the sealing portion 14. In this way, the exhaust pipe 22 and the connecting housing 10 can be quickly assembled and disassembled.

Figure 2:
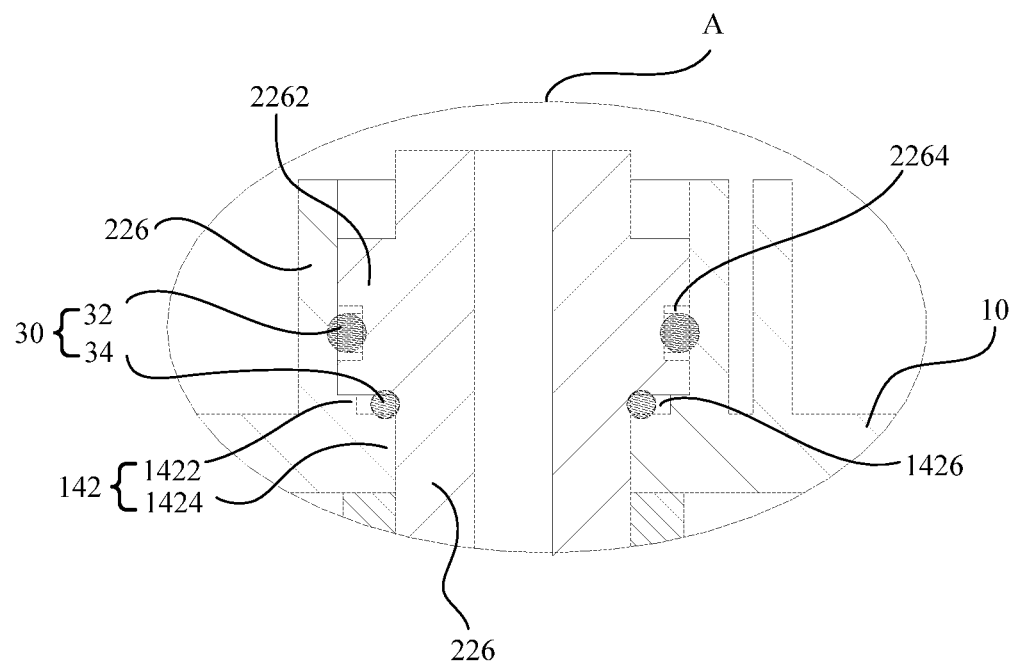
FIG. 2 is an enlarged schematic diagram of part A in FIG. 1.

As illustrated in FIG. 1 and FIG. 2, according to an alternative embodiment, the connecting structure further includes a sealing member 30 in a shape of a ring sleeved on the connecting portion 226. One side of the sealing member 30 is connected to an outer wall of the connecting portion 226, and the other side of the sealing member 30 is connected to an inner wall of the sealing portion 14. Thus, a gap between the outer wall of the connecting portion 226 and the inner wall of the sealing portion 14 can be sealed to form a sealing connection between the exhaust pipe 22 and the sealing portion 14, thereby preventing the high-pressure refrigerant from leaking through the gap between the connecting portion 226 of the exhaust pipe 22 and the sealing portion 14.

Further, the sealing member 30 includes, but is not limited to, an O-shaped ring, a U-shaped ring, and a C-shaped ring.

As illustrated in FIG. 1 and FIG. 2, according to an alternative embodiment, along a radial direction of the sealing portion 14, a first limiting portion 142 is formed by the inner wall of the sealing portion protruding inwards; and along the radial direction of the sealing portion 14, a second limiting portion 2262 is formed by the outer wall of the connecting portion protruding outwards. In this embodiment, the second limiting portion 2262 is arranged in the sealing portion 14, and along an axial direction of the connecting portion 226, a side of the second limiting portion 2262 close to the pipe body 224 abuts against a side of the first limiting portion 142 facing away from the pipe body 224, thereby restricting the movements of the exhaust pipe 22 towards the outside of the connecting housing 10.

As illustrated in FIG. 1 and FIG. 2, according to an alternative embodiment, along the radial direction of the sealing portion 14, a first accommodating space 2264 is defined between an outer wall of the second limiting portion 2262 and the inner wall of the sealing portion 14, and the sealing member 30 is disposed in the first accommodating space 2264. In this embodiment, an outer wall of the sealing member 30 is connected to the inner wall of the sealing portion 14, and an inner wall of the sealing member 30 is connected to the second limiting portion 2262, achieving the sealing connection between the exhaust pipe 22 and the sealing portion 14. In addition, by disposing the sealing member 30 in the first accommodating space 2264, the movements of the sealing member 30 relative to the connecting portion 226 along the axial direction of the connecting portion 226 can be restricted, and the sealing member 30 is prevented from sliding out of the second limiting portion 2262 during the mounting of the exhaust pipe assembly 20.

Further, along the axial direction of the sealing portion 14, a second accommodating space 1426 is defined between the first limiting portion 142 and the second limiting portion 2262. By disposing the sealing member 30 in the second accommodating space 1426, the sealing member 30 can seal the exhaust pipe 22 and the sealing portion 14, along the axial direction of the sealing portion 14. When the connecting member 24 provides the connecting portion 226 with a pretension force towards the side of the pipe body 224, the sealing member 30 disposed in the second accommodating space 1426 can buffer the pressure exerted by the second limiting portion 2262 on the sealing member 30. In this way, it is avoided that the sealing performance of the sealing member 30 deteriorates when the sealing member 30 is damaged under an excessive pressure.

Figure 3:
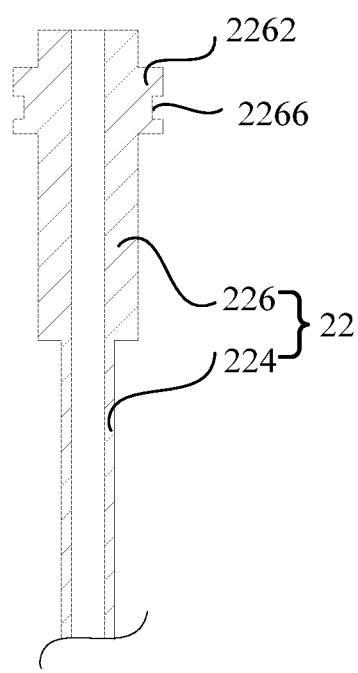
FIG. 3 is a structural schematic diagram of an exhaust pipe according to an embodiment of the present disclosure.

As illustrated in FIG. 2 and FIG. 3, according to an alternative embodiment, the connecting structure further includes a sealing groove 2266 defined in the outer wall of the second limiting portion 2262 and located within the sealing portion 14, and the first accommodating space 2264 is defined by the sealing groove 2266 and the inner wall of the sealing portion 14. The sealing member 30 includes a first sealing member 32 arranged in the sealing groove 2266. Along the radial direction of the first sealing member 32, an outer wall of the first sealing member 32 is connected to the inner wall of the sealing portion 14, and an inner wall of the first sealing member 32 is connected to the bottom of the sealing groove 2266, thereby sealing the gap between the connecting portion 226 and the sealing portion 14 along the radial direction of the sealing portion 14, and forming the sealing connection between the exhaust pipe 22 and the sealing portion 14.

For example, along the radial direction of the sealing portion 14, a depth of the sealing groove 2266 is smaller than a length of a cross section of the first sealing member 32, to ensure that the outer wall and the inner wall of the first sealing member 32 are connected to the inner wall of the sealing portion 14 and the sealing groove 2266, respectively.

As illustrated in FIG. 2, in addition to the features provided in any of the above embodiments, it is further defined that: the first limiting portion 142 is in a stepped structure and includes a first step 1422 arranged on one side of the first limiting portion 142 facing away from the pipe body 224, and a second step 1424 arranged on the other side of the first limiting portion 142 close to the pipe body 224. In this way, along the axial direction of the connecting portion 226, the second limiting portion 2262 abuts against the first step 1422 with the side close to the pipe body 224 to define the second accommodating space 1426 between the second limiting portion 2262 and the second step 1424. The sealing member can include a second sealing member 34 arranged in the second accommodating space 1426, and along the axial direction of the second sealing member 34, two ends of the second sealing member 34 are connected to the second limiting portion 2262 and the second step 1424, respectively. Thus, along the axial direction of the sealing portion 14, the gap between the connecting portion 226 and the sealing portion 14 can be sealed, forming the sealing connection between the exhaust pipe 22 and the sealing portion 14.

For example, along the axial direction of the sealing portion 14, a length of a gap between the second limiting portion 2262 and the second step 1424 is smaller than a length of a cross section of the second sealing member 34 to ensure that the two ends of the second sealing member 34 are connected to the second limiting portion 2262 and the second step 1424, respectively.

As illustrated in FIG. 1, according to an alternative embodiment, the exhaust silencer includes a casing and the connecting structure as described in any of the above embodiments, the connecting housing 10 of the connecting structure is connected to the casing of the exhaust silencer, and an exhaust silencing chamber 12 is in communication with the silencing chamber 12. Therefore, the exhaust silencer has the technical effects as described in any of the above embodiments, and the detailed description thereof will be omitted herein.

According to yet another embodiment of the present disclosure, a silencer is provided. The silencer includes a suction silencer and the exhaust silencer as described in the above embodiment and connected to the suction silencer, the suction silencer has a suction silencing chamber 12 defined therein and configured to reduce the noise of the compressor at work, and the exhaust silencing chamber 12 is in communication with the suction silencing chamber 12. Therefore, the silencer has the technical effects as described in the above embodiment, and the detailed description thereof will be omitted herein.

According to still yet another embodiment of the present disclosure, a compressor is provided. The compressor includes a compressor housing, and the silencer as described in the above embodiment and arranged in the compressor housing. Therefore, the compressor has the technical effects as described in the above embodiment, and the detailed description thereof will be omitted herein.

As illustrated in FIG. 1 and FIG. 2, an exemplary embodiment of the present disclosure provides a connecting structure. The connecting structure includes a silencer housing (i.e., the connecting housing 10), an inner exhaust pipe (i.e., the exhaust pipe 22), an O-shaped ring 1 (i.e., the first sealing member 32), an O-shaped ring 2 (i.e., the second sealing member 34), and a nut (i.e., the connecting member 24). In this embodiment, one end of the inner exhaust pipe passes through the silencer housing, and the other end of the inner exhaust pipe is arranged outside the silencer housing. Thus, the inner exhaust pipe enables an inner space of the silencer housing to be in communication with an outer space of the silencer housing. The O-shaped ring 1 and the O-shaped ring 2 are respectively sleeved on the inner exhaust pipe extending into the silencer housing. The inner exhaust pipe and the silencer housing are radially sealed by the O-shaped ring 1, and the inner exhaust pipe and the silencer housing are axially sealed by the O-shaped ring 2. The inner exhaust pipe has threads provided on a lower end portion thereof, and the nut is disposed on the lower end portion of the inner exhaust pipe for tightening. The inner exhaust pipe is fixed by pulling down, and the two O-shaped rings can exert the sealing effect. In this embodiment, the inner exhaust pipe belongs to an exhaust side and is subject to higher exhaust pressure. The two O-shaped rings are configured to seal the inner exhaust pipe and the silencer housing along an axial direction and a radial direction of the inner exhaust pipe, respectively, so as to improve the sealing effect.

According to an alternative embodiment, a one-piece silencer is provided. The one-piece silencer includes the connecting structure according to the previous embodiment. In this embodiment, the one-piece silencer housing (i.e., the connecting housing 10) is made of the PBT material, thereby saving material costs, and the inner exhaust pipe (i.e., the exhaust pipe 22) is made of the PA66 material, thereby satisfying the operation requirements of high temperature resistance and high-pressure resistance on the exhaust side while having the sealing effect.

According to the connecting structure provided by the present disclosure, the exhaust pipe assembly and the sealing portion are detachably connected to each other. Thus, different materials can be used to reduce material costs under the premise of satisfying the operation requirements of the connecting housing and the exhaust pipe.

In the present disclosure, terms "first", "second", and "third" are only used for descriptive purposes, and cannot be understood as indicating or implying relative importance. The term "plurality of" means at least two, unless otherwise specifically defined. Terms such as "install", "connect", "connect to", "fix" and the like should be understood in a broad sense, for example, it may be a fixed connection, a detachable connection, or a connection as one piece; and it may be a direct connection, or an indirect connection through an intermediate. For those skilled in the art, the specific meaning of the above-mentioned terms in the present disclosure can be understood according to specific circumstances.

In the description of the present disclosure, it should be understood that the orientation or position relationship indicated by the terms "upper", "lower", "left", "right", "front", "rear", etc., is based on the orientation or position relationship shown in the drawings, and is only for the convenience of describing the present disclosure and simplifying the description, rather than indicating or implying that the pointed apparatus or unit must have a specific orientation, or be constructed and operated in a specific orientation, and therefore cannot be understood as a limitation of the present disclosure.

In the description of this specification, descriptions with reference to the terms "an embodiment", "some embodiments", or "specific embodiments" etc., mean that specific features, structure, materials or characteristics described in conjunction with the embodiment or example are included in at least one embodiment or example of the present disclosure. In the specification, the schematic representations of the above terms do not necessarily refer to the same embodiment or example. Moreover, the described specific features, structures, materials or characteristics may be combined in any one or more embodiments or examples in a suitable manner.

The above are merely preferred embodiments of the present disclosure, but are not intended to limit the present disclosure. Various changes and variations of the present disclosure are conceivable for those skilled in the art. Any modification, equivalent replacement, improvement, etc., made within the spirit and principle of the present disclosure shall be included within the protection scope of the present disclosure.

What is claimed is:

1. A connecting structure comprising:
   a housing forming:
      a silencing chamber defined at least partially by an outer wall of the housing;
      a sealing portion that extends from the outer wall of the housing into the silencing chamber and forms a cylindrical space in communication with the silencing chamber; and
      a hole through the outer wall of the housing in communication with the cylindrical space, the hole having a smaller diameter than the cylindrical space; and
   an exhaust pipe with a connecting portion comprising:
      a second limiting portion disposed within the cylindrical space of the sealing portion of the housing; and
      another portion that is attached to the second limiting portion, has a smaller diameter than the second limiting portion, and extends through the hole,
   wherein the silencing chamber and an outside space of the housing are in communication with each other through the exhaust pipe.

2. The connecting structure according to claim 1, further comprising a connecting member arranged on the exhaust pipe that is configured to restrict movement of the exhaust pipe towards the silencing chamber.

3. The connecting structure according to claim 2, wherein the connecting member is detachably connected to the other portion and abuts against an exterior side of the outer wall.

4. The connecting structure according to claim 2, wherein:
   the other portion comprises external threads; and
   the connecting member comprises a nut threaded onto the external threads of the other portion.

5. The connecting structure according to claim 2, wherein:
   the other portion comprises a slot; and
   the connecting member comprises a snap ring arranged in the slot.

6. The connecting structure according to claim 1, further comprising a sealing member disposed on an outer wall of the connecting portion and within the cylindrical space.

7. The connecting structure according to claim 6, wherein the sealing member is disposed on the other portion between the second limiting portion and the outer wall of the housing further.

8. The connecting structure according to claim 7, wherein:
   the cylindrical space comprises a first limiting portion proximate the outer wall of the housing with a decreased diameter;
   the second limiting portion has a diameter larger than the decreased diameter of the first limiting portion; and the sealing member is disposed within a space formed between the second limiting portion and the outer wall of the housing.

9. The connecting structure according to claim 8, wherein:
the second limiting portion comprises a sealing groove defined in the outer wall of the second limiting portion;
a cylindrical wall of the sealing portion forms the cylindrical space; and
the sealing member is disposed within the sealing groove and contacts the second limiting portion and the cylindrical wall.

10. The connecting structure according to claim 2, wherein;
the sealing member is one of a plurality of sealing members; and
the connecting structure further comprises another sealing member disposed on the other portion between the second limiting portion and the outer wall of the housing.

11. An exhaust silencer comprising:
a casing defining an exhaust silencing chamber; and
a connecting structure comprising:
  a housing forming:
    a silencing chamber connected to the casing, in communication with the exhaust silencing chamber, and defined at least partially by an outer wall of the housing;
    a sealing portion that extends from the outer wall of the housing into the silencing chamber and forms a cylindrical space in communication with the silencing chamber; and
    a hole through the outer wall of the housing in communication with the cylindrical space, the hole having a smaller diameter than the cylindrical space; and
  an exhaust pipe with a connecting portion comprising:
    a second limiting portion disposed within the cylindrical space of the sealing portion of the housing; and
    another portion that: is attached to the second limiting portion, has a smaller diameter than the second limiting portion, and extends through the hole,
  wherein the silencing chamber and an outside space of the housing are in communication with each other through the exhaust pipe.

12. The exhaust silencer according to claim 11, wherein the connecting structure further comprises a connecting member arranged on the exhaust pipe that is configured to restrict movement of the exhaust pipe towards the silencing chamber.

13. The exhaust silencer according to claim 12, wherein the connecting member is detachably connected to the other portion and abuts against an exterior side of the outer wall.

14. The exhaust silencer according to claim 12, wherein:
the other portion comprises external threads; and
the connecting member comprises a nut threaded onto the external threads of the other portion.

15. The exhaust silencer according to claim 12, wherein:
the other portion comprises a slot; and
the connecting member comprises a snap ring arranged in the slot.

16. The exhaust silencer according to claim 11, further comprising a sealing member disposed on an outer wall of the connecting portion and within the cylindrical space.

17. The exhaust silencer according to claim 16, wherein the sealing member is disposed on the other portion between the second limiting portion and the outer wall of the housing.

18. The exhaust silencer according to claim 16, wherein:
the second limiting portion comprises a sealing groove defined in the outer wall of the second limiting portion;
a cylindrical wall of the sealing portion forms the cylindrical space; and
the sealing member is disposed within the sealing groove and contacts the second limiting portion and the cylindrical wall.

19. A silencer comprising:
a suction silencer forming a suction silencing chamber; and
the exhaust silencer according to claim 11,
wherein:
  the exhaust silencer is connected to the suction silencer; and
  the exhaust silencing chamber is in communication with the suction silencing chamber.

20. A compressor comprising:
a compressor housing; and
the silencer according to claim 19,
wherein the silencer is arranged in the compressor housing.

\* \* \* \* \*